(12) United States Patent
Bao

(10) Patent No.: US 6,426,833 B1
(45) Date of Patent: Jul. 30, 2002

(54) OPTICAL AMPLIFIER CONFIGURATION INCLUDING SHARED PUMPS

(75) Inventor: Jun Bao, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/628,259

(22) Filed: Jul. 28, 2000

(51) Int. Cl.$^7$ .............................. G02B 6/26; H01S 3/30
(52) U.S. Cl. ................ 359/341.32; 359/134; 359/160; 372/70
(58) Field of Search ................ 359/134, 160, 359/334, 341.32, 341.33; 372/3, 70

(56) References Cited

U.S. PATENT DOCUMENTS

| | | | | |
|---|---|---|---|---|
| 4,383,318 A | * | 5/1983 | Barry et al. ............... | 372/70 |
| 4,881,790 A | * | 11/1989 | Mollenauer ................. | 359/341 |
| 5,173,957 A | | 12/1992 | Bergano et al. ............. | 385/24 |
| 5,241,414 A | * | 8/1993 | Giles et al. ................ | 359/341 |
| 5,392,154 A | * | 2/1995 | Chang et al. ............... | 359/341 |
| 5,406,411 A | * | 4/1995 | Button et al. ............... | 359/344 |
| 5,721,636 A | * | 2/1998 | Erdogan et al. ............. | 359/341 |
| 5,920,423 A | * | 7/1999 | Grubb et al. ............... | 359/160 |
| 5,936,763 A | * | 8/1999 | Mitsuda et al. ............. | 359/160 |
| 6,115,174 A | * | 9/2000 | Grubb et al. ............... | 359/334 |

FOREIGN PATENT DOCUMENTS

| | | | |
|---|---|---|---|
| JP | 4-3029 | * | 8/1992 |
| JP | 5-224254 | * | 9/1993 |
| JP | 5145161 | * | 11/1993 |
| WO | 91/00267 | * | 4/1992 |

OTHER PUBLICATIONS

Ogoshi et al, Tech. Report of IBICE, RXD 96–39, CPM 96–62, pp. 1–7.*

* cited by examiner

*Primary Examiner*—Nelson Moskowitz
(74) *Attorney, Agent, or Firm*—David L. Soltz

(57) ABSTRACT

An optical amplifier including shared pumps sources. Outputs from a plurality amplifier pump sources are combined and then divided before being injected into one or more amplifying fiber segments. By sharing pumps, signal loss is avoided in the event of pump failure.

2 Claims, 5 Drawing Sheets

OPTICAL AMPLIFIER CONFIGURATION INCLUDING SHARED PUMPS

FIELD OF THE INVENTION

The present invention relates in general to optical amplifiers, and in particular to an optical amplifier configuration including shared pumps for use in optical communication systems.

BACKGROUND OF THE INVENTION

Optical amplifiers have become an essential component in transmission systems and networks to compensate for system losses, particularly in wavelength division multiplexed (WDM) or dense wavelength division multiplexed (DWDM) communication systems, wherein a plurality of distinct optical wavelengths or channels are multiplexed and propagated over an optical medium to a plurality of receivers. In a WDM or DWDM system, one of the most efficient and commonly used amplifier devices is the Erbium-doped fiber amplifier (EDFA), which has a gain bandwidth of about 35 nm in the 1.55 µm wavelength region. Unlike semiconductor optical amplifiers, EDFAs do not require conversion of an optical signal into an electronic signal and back. An EDFA operates by passing an optical signal (e.g. a discrete wavelength) through an erbium-doped fiber segment, and "pumping" the segment with light from another laser, thereby strengthening the optical signal and returning it to its original levels without leaving the fiber optic cable for separate electronic processing.

The segment of fiber may be a segment of doped optical fiber in which the dopant is selected from materials that can produce laser action in the fiber segment. Such materials can include rare earth dopants such as erbium, neodynium, praseodymium, ytterbium, or mixtures thereof. Pumping of a doped fiber segment at a specific pump wavelength causes population inversion among the electron energy levels of the dopant, producing optical amplification of the wavelength division multiplexed optical signals.

The amplifier configuration depends on the spectral bandwidth of the signal to be amplified. C-band amplifiers, for example, operate in the range of approximately 1527 nm to approximately 1565 nm, and L-band amplifiers operate in the range of approximately 1565 nm to approximately 1610 nm. An L-band fiber may be approximately five times as long as the C-band amplifier fiber, or may be doped with approximately 5 to 6 times the erbium provided in the C-band fiber. For a C-band amplifier, in view of the short length of the fiber, pumps operating at approximately 980 nm are efficient. For an L-band amplifier, pumps operating at approximately 1480 nm are more efficient, since the use of a 980 nm pump results in only about 37% to 40% inversion.

Typical configurations of EDFAs include two-stage and three-stage amplifiers. A two-stage optical amplifier, well known in the art, can include two segments of erbium-doped fiber spaced by a relatively short length of undoped fiber, and three pumps (e.g. laser diodes). The first doped fiber segment (i.e., the first stage) may be pumped in a forward direction with an appropriate wavelength and at a sufficient intensity to provide high gain but low noise, while the second doped fiber segment (i.e., the second stage) is pumped in both forward and reverse directions to provide high power. Accordingly, such two-stage amplifiers provide gain at high power, but relatively little noise. Likewise, a three-stage optical amplifier can include three doped fiber segments spaced by two relatively short lengths of undoped fiber, and four pumps.

A problem associated with the use of optical amplifiers, however, is the signal loss associated with a failed laser pump, particularly in two-stage and three-stage configurations. Since the signal power is absorbed as it travels through the length of the fiber, eventually it becomes so weak that the gain reduces to zero and the pumped fiber becomes absorbing rather than amplifying. For example, FIG. 1 shows a prior art three-stage optical amplifier configuration with four separate pumps for amplifying an input signal 109. In the first and second stages, a wavelength of light or is provided or "pumped" in a forward direction by the first pump 101 and the second pump 102, at amplifying fiber segments 117 and 118, respectively. In the third stage, the third pump 103 pumps amplifying fiber segment 119 in a forward direction, and the fourth pump 104 pumps fiber segment 119 in a reverse direction, and an amplified output signal 109a is provided.

FIG. 2 illustrates an exemplary gain vs. wavelength characteristic for the three-stage amplifier configuration of FIG. 1 in five different states. In the first state, as represented by curve 201, all four pumps 101–104 are functioning normally. In the second state, as represented by curve 205, the first pump 101 fails, i.e. suffers a reduction or complete loss of output power, or otherwise ceases to function properly. In the third state, as represented by curve 204, the second pump 102 fails. In the fourth state, as represented by curve 202, the third pump 103 fails. In the fifth state, as represented by curve 203, the fourth pump 104 fails.

As can be seen in FIG. 2, with all four pumps operating normally, a gain of about 26 dB may be obtained in the range of about 1572 to 1605 nm. However, if the first pump 101 fails, a loss of approximately 45 dB is experienced. If the second pump 102 fails, a gain of approximately 10–15 dB is experienced over the same range. If the third pump 103 or the fourth pump 104 fails, a gain of about 21–24 dB is experienced. Thus, as can be seen in FIG. 2, in the event of pump failure, signals at shorter wavelengths are absorbed by the fiber to a far greater extent than signals at longer wavelengths. Moreover, in the three-stage amplifier configuration of FIG. 1, it is seen that while significant reduction in amplifier gain occurs if the third 103 or fourth pump 104 fails, failure of either of pumps 101 and 102 can result in a complete loss of the signal.

Accordingly, there is a need in the art for an optical amplifier configuration that provides failsafe capabilities in the event of pump failure to prevent signal loss.

SUMMARY OF THE INVENTION

The present invention is organized about the concept of pump sharing. Instead of each pump providing a wavelength of light directly into an amplifying fiber segment, the outputs of the pumps are combined and then divided before being injected into the fiber segments. Thus, by coupling the outputs of two or more pumps and then splitting the coupled output onto two or more output fibers, a failsafe for preventing signal loss is provided, wherein power from at least one of the pumps is provided to each of the output fibers in the event a pump fails.

In particular, an optical amplifier configuration consistent with the present invention includes: a plurality of optical pump sources, each pump source being configured to provide an output pump signal; a coupler configured to combine the pump signals into a combined signal; and a splitter for receiving the combined signal and splitting the combined signal into a plurality of separate signals, at least one of the separate signals being for introduction into at least one associated fiber segment for amplifying an optical signal.

In one exemplary embodiment, a three-stage optical amplifier configuration includes four pumps, three amplifying fiber segments, a coupler for combining a plurality of pump outputs, and a splitter for dividing the coupled output wavelength into separate output fibers, to be pumped into the fiber segments. The outputs from the first and second pumps are combined by the coupler, and the combined output is split by the splitter in half and provided in a forward direction into the first and second amplifying fiber segments. The third pump pumps the third amplifying fiber segment in a forward direction, and the fourth pump pumps the third amplifying fiber segment in a reverse direction. Thus, if either the first or second pump fails, the output from the remaining operating pump is divided in half and is provided in a forward direction into the first and second amplifying fiber segments, each of the output wavelengths being reduced to 50% of its original power.

In another exemplary embodiment, a two-stage optical amplifier configuration includes three pumps, two amplifying fiber segments, a coupler and a splitter. The output from the first pump is provided in a forward direction into the first amplifying fiber segment. The outputs from the second and third pumps are combined and split, and then provided in a forward and in a reverse direction into the second amplifying fiber segment. Thus, if either the second or third pump fails, the output from the remaining pump is divided in half and is provided in a forward and a reverse direction into the second amplifying fiber segment, each of the output wavelengths being reduced to 50% of its original power.

A method of pumping an amplifying optical fiber segment consistent with the invention includes the steps of: combining a plurality of optical pump signals into a combined pump signal; splitting the combined pump signal into separate pump signals; and introducing at least one of the separate pump signals into the fiber segment.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION OF THE INVENTION

Figure 3:
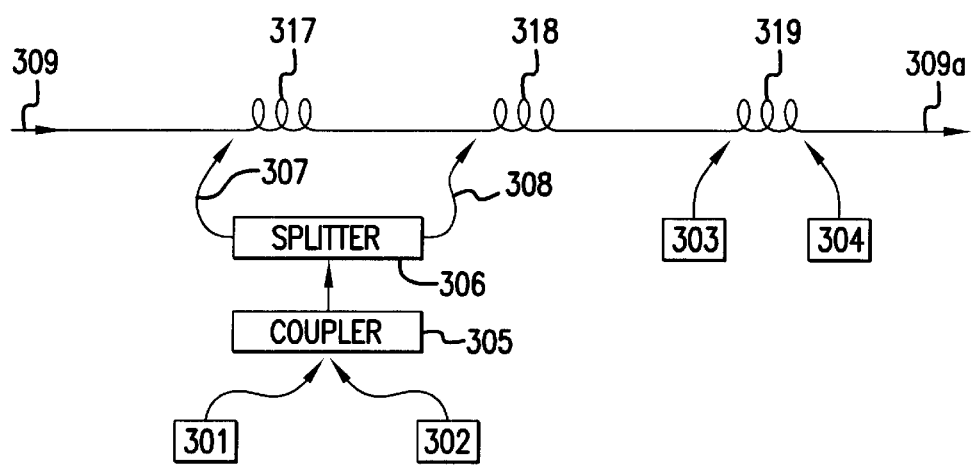
FIG. 3: is a schematic diagram of an exemplary embodiment of a three-stage optical amplifier configuration consistent with the present invention.

FIG. 3 illustrates an exemplary embodiment of a three-stage optical amplifier configuration consistent with the present invention. As shown, the exemplary configuration includes three amplifying fiber segments 317, 318 and 319, four pumps 301, 302, 303 and 304, a coupler 305 for combining the outputs of pumps 301 and 302, and a splitter 306 for dividing the coupled output and providing the divided output to two separate output fibers 307 and 308.

For ease of explanation, the coupler 305 and splitter 306 are illustrated as separate elements. It is to be understood, however, that the coupler may be an optical device that can receive a plurality of optical inputs and combine them into one output on a single output path. The splitter may be any optical device that can divide an input optical wavelength and place it onto a plurality of output paths. Those skilled in the art will recognize a variety of devices or combinations of devices for achieving these purposes. For example, one or more hybrid optical coupling devices may be used in place of the coupler, the splitter, or both. Such a hybrid device would receive a plurality of input optical wavelengths and provide a plurality of output optical wavelengths (e.g. combining three inputs into two outputs; splitting five inputs into eight outputs; or even operating to combine four inputs into a single wavelength and then dividing the single wavelength so as to provide four separate outputs). Also, an amplifying fiber segment, or waveguide, as defined herein, includes any segment of fiber into which at least one pump wavelength is introduced for purposes of amplification (e.g. a fiber segment in a Raman fiber amplifier), and is not limited to rare earth-doped segments of fiber.

In operation, pumps 301 and 302 provide outputs received by the coupler 305. The coupler provides a combined output including the outputs of pumps 301 and 302, to the splitter 306. The splitter 306 divides the combined output into equal portions on two separate output fibers 307 and 308. The output fibers 307 and 308 provide the output wavelengths into amplifying fiber segments 317 and 318, respectively. Pump 303 directly pumps amplifying fiber segment 319 in a forward direction, and pump 304 directly pumps amplifying fiber segment 319 in a reverse direction.

Thus, in the first and second stages, the input signal 309 is amplified by pumping the fiber segments 317 and 318 in a forward direction by the combined and re-divided outputs of the first pump 301 and the second pump 302. In the third stage, the input signal is amplified by the third pump 303, which directly pumps the segment 319 in a forward direction, and the fourth pump 304, which directly pumps the segment 319 in a reverse direction. Amplified output signal 309a is provided. In this configuration, failure of either the first 301 or second pump 302 results in the output from the remaining operating pump being divided in half and being provided in a forward direction, via output fibers 307 and 308 into fiber segments 317 and 318, respectively. Of course, each of the output wavelengths is reduced to 50% of its original power.

Figure 4:
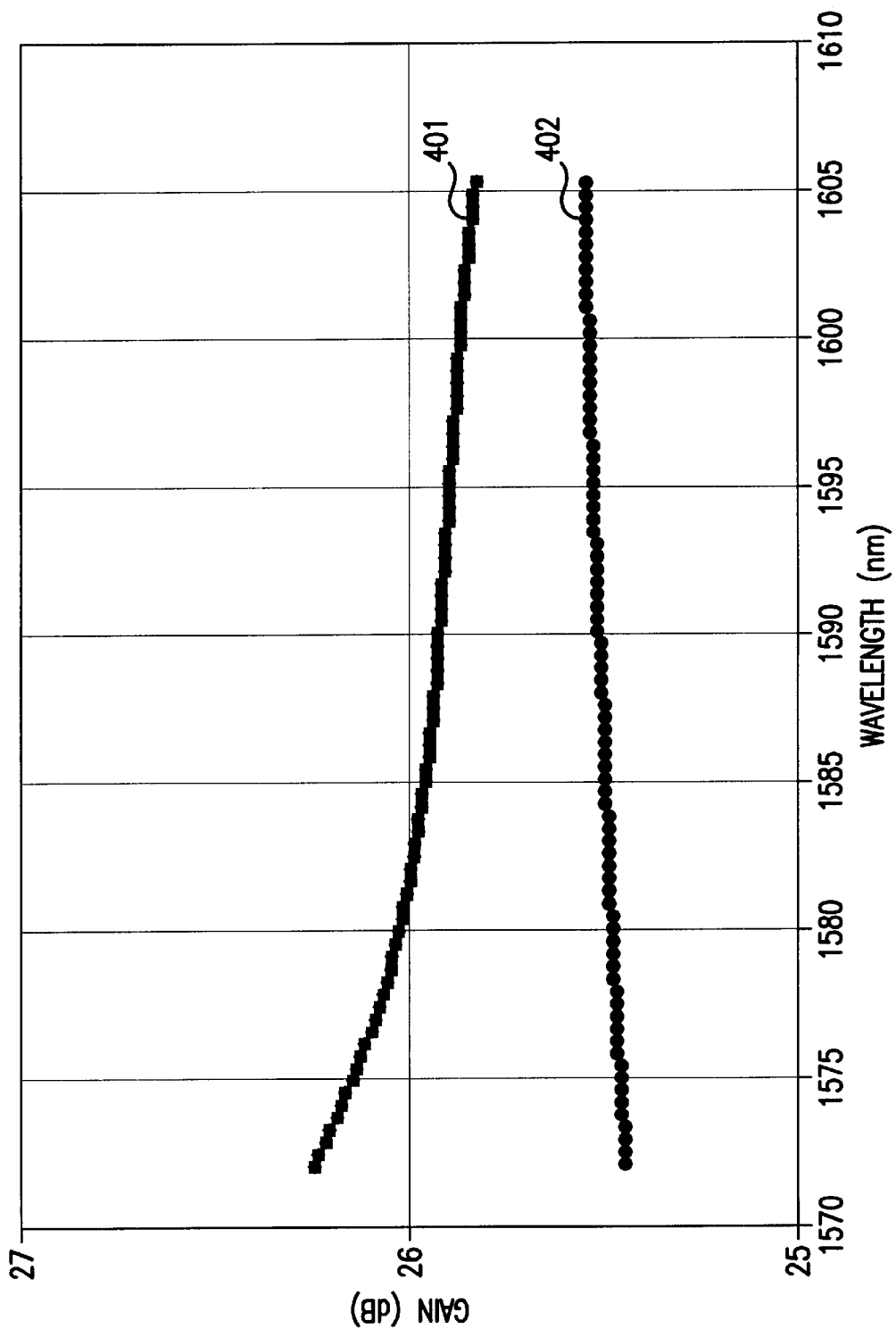
FIG. 4: illustrates gain v. wavelength for the exemplary three-stage optical amplifier configuration of FIG. 3, in two different states.

FIG. 4 illustrates gain vs. wavelength for the three-stage optical amplifier configuration of FIG. 3, in two different states. In the first state, as represented by curve 401, all four pumps 301–304 are functioning normally. In the second state, as represented by curve 402, either the first 301 or second pump 302 fails, and, due to the shared pump configuration consistent with the present invention, the shared output of the remaining operating pump is provided via output fibers 307 and 308 into fiber segments 317 and 318, respectively. As shown, if the first 301 or second pump 302 fails, the normalized power of the four pumps may be at a ratio of 0.5:0.5:1:1, and a gain difference of less than 1 dB relative to the total gain is experienced in the range of approximately 1572 to 1605 nm. Thus, as can be seen FIG.

Figure 1:
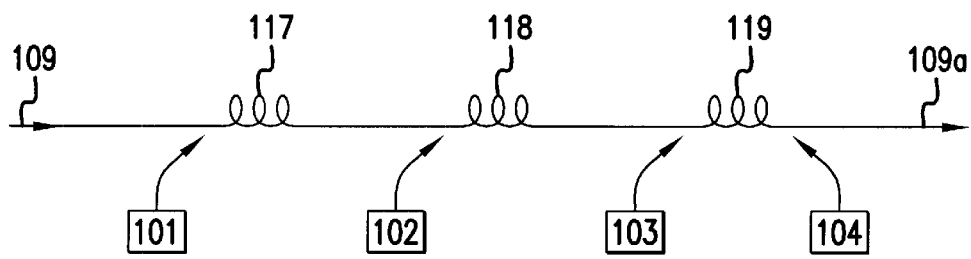
FIG. 1: is a schematic diagram of a prior art three-stage optical amplifier configuration.
Figure 2:
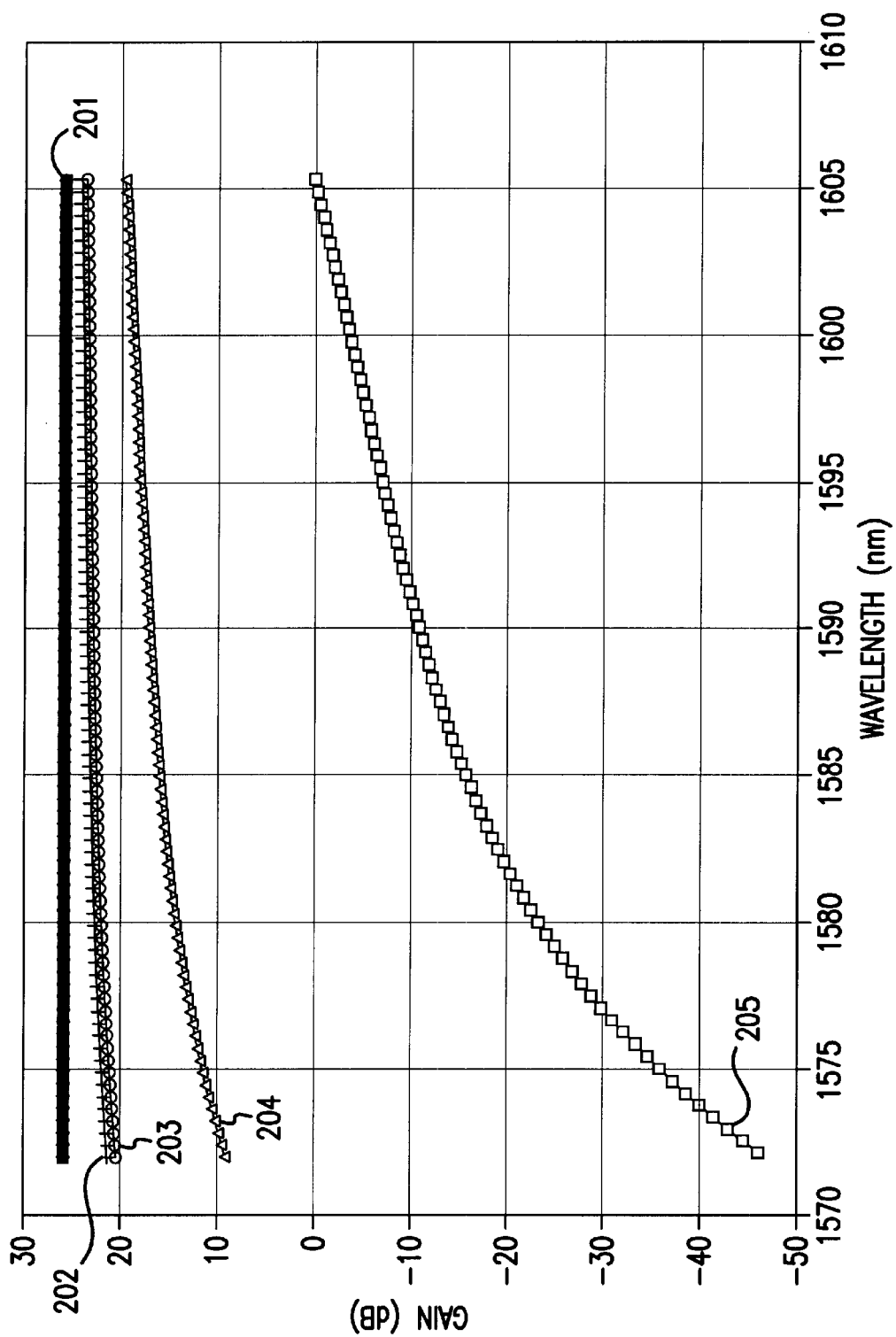
FIG. 2: illustrates gain vs. wavelength for the prior art three-stage optical amplifier configuration of FIG. 1 in five different states.

4, particularly as compared to the prior art configuration illustrated by FIGS. 1 and 2, a shared pump configuration consistent with the present invention provides significant mitigation of the effects of pump failure.

Figure 5:
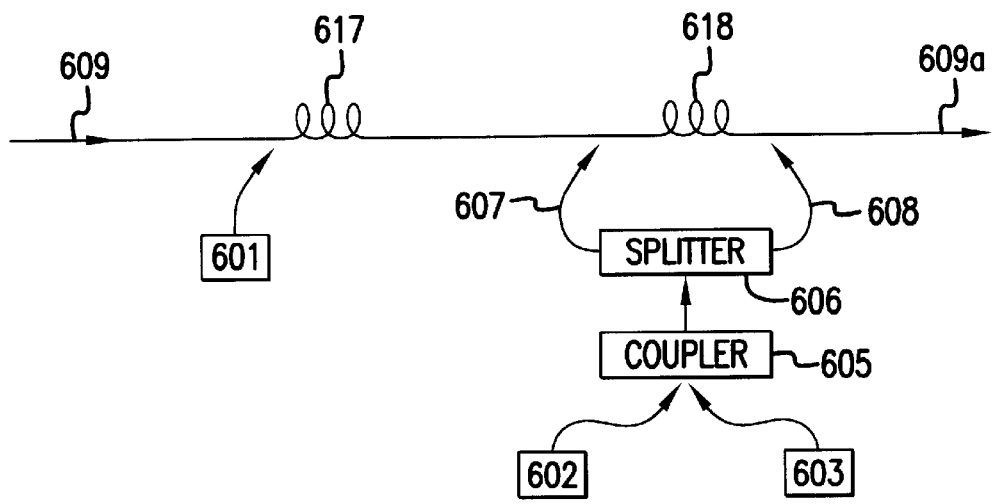
FIG. 5: is a schematic diagram of an exemplary embodiment of a two-stage optical amplifier configuration consistent with the present invention.

FIG. 5 illustrates an exemplary embodiment of a two-stage optical amplifier configuration consistent with the present invention. As shown, the exemplary configuration includes two amplifying fiber segments 617 and 618, three pumps 601, 602 and 603, a coupler 605 for combining the outputs of pumps 602 and 603, and a splitter 606 for dividing the coupled output and providing the divided output to two separate output fibers 607 and 608.

In operation, pumps 602 and 603 provide outputs received by the coupler 605. The coupler provides a single combined output including the output of pumps 602 and 603, which is received by the splitter 606. The splitter 606 divides the combined output into equal portions and provides the divided output to two separate output fibers 607 and 608. The output fibers 607 and 608 pump fiber segment 618 in a forward and reverse direction, respectively. Pump 601 directly pumps fiber segment 617 in a forward direction.

Thus, in the first stage, the input signal 609 is amplified by pumping fiber segment 617 directly by the first pump 601 in a forward direction. In the second stage, fiber segment 618 is pumped by the combined and re-divided outputs of the second pump 602 and the third pump 603, in a forward and reverse direction, respectively, and an amplified output signal 609a is provided. In this configuration, failure of either the first 601 or second pump 602 results in the output from the remaining operating pump being divided in half and being provided in a forward direction, via output fibers 607 and 608 into fiber segments 317 and 318, respectively. Of course, each of the output wavelengths is reduced to 50% of its original power. Again, however, the shared pump configuration consistent with the present invention prevents a reduction of signal gain to the extent that the signal is ultimately lost.

A variety of other pump sharing configurations consistent with the present invention are possible. For example, in the configuration illustrated in FIG. 5, the first segment 617 may be pumped in forward and reverse directions using shared pump sources. It is to be understood, therefore, that the embodiments illustrated herein are provided by way of illustration, not of limitation. In fact, pump sharing consistent with the invention may be provided for any number of amplifying fiber segments or combinations thereof. Also, a pump sharing configuration consistent with the invention may be provided for pumping one or more amplifying segments in forward and/or reverse directions.

Figure 6:
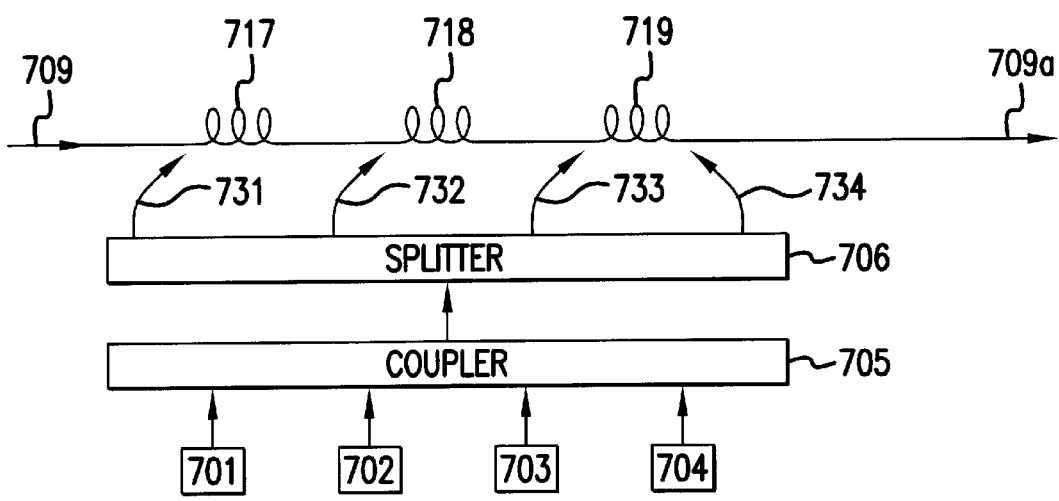
FIG. 6: is a schematic diagram of an exemplary embodiment of a three-stage optical amplifier configuration consistent with the present invention.

Turning to FIG. 6, for example, there is illustrated another exemplary embodiment of a three-stage optical amplifier configuration consistent with the present invention. As shown, the exemplary configuration includes three fiber segments 717, 718 and 719, four pumps 701, 702, 703 and 704, a coupler 705 for combining the outputs of pumps 701, 702, 703 and 704, and a splitter 706 for dividing the coupled output and providing the divided output to four separate output fibers 731, 732, 733 and 734.

In operation, pumps 701, 702, 703 and 704 provide output received by the coupler 705. The coupler provides a single combined output including the output of pumps 701, 702, 703 and 704, which is received by the splitter 706. The splitter 706 divides the combined output into equal portions onto four separate output fibers 731, 732, 733 and 734. The output fibers 731, 732, 733 and 734 pump fiber segments 717, 718 and 719. In the first two stages, output fiber 731 pumps segment 717 in a forward direction, and output fiber 732 pumps segment 718 in a forward direction. In the third stage, output fibers 733 and 734 pump segments 719 in a forward and reverse direction, respectively. Thus, in all three stages, the input signal 709 is amplified by pumping the fiber segments with the combined and re-divided outputs of the pumps 701, 702, 703 and 704, and an amplified output signal 709a is provided. In this configuration, failure of any of pumps 701, 702, 703 or 704 results in the output from the remaining operating three pumps being divided four ways and being provided at equal power via output fibers 731, 732, 733 and 734. Of course, each of the output wavelengths is reduced to 75% of its original power.

Figure 7:
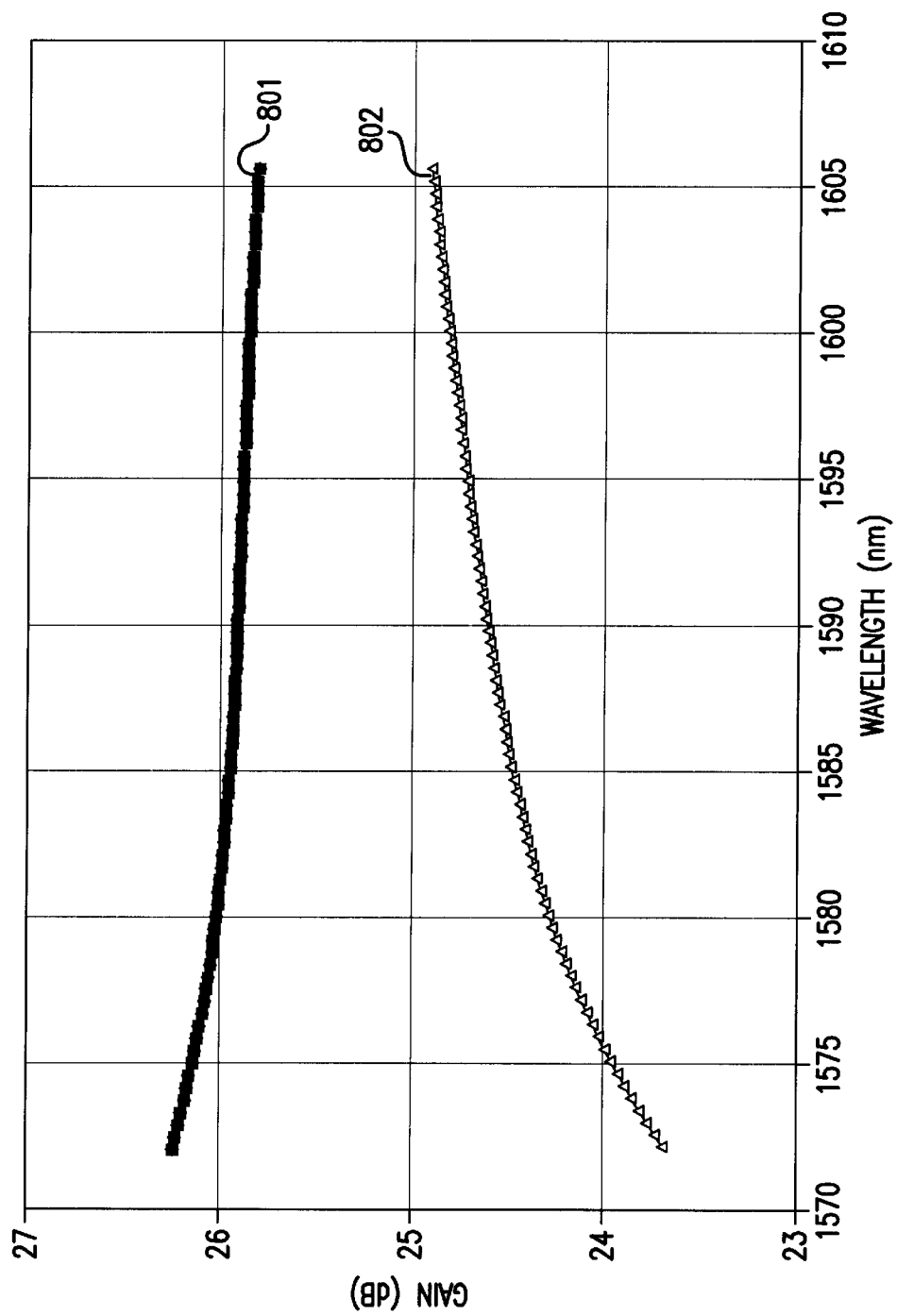
FIG. 7: illustrates gain v. wavelength for the exemplary three-stage optical amplifier configuration of FIG. 7, in two different states.

FIG. 7 illustrates gain vs. wavelength for the exemplary three-stage optical amplifier configuration of FIG. 6 consistent with the present invention, in two different states. In the first state, as represented by curve 801, all four pumps 701–704 are functioning normally. In the second state, as represented by curve 802, any one of pumps 701–704 fails, and, due to the pump sharing configuration consistent with the present invention, the shared output of the remaining operating pumps is provided via output fibers 731–734 into fiber segments 717, 718 and 719. As FIG. 7 shows, if any one of pumps 701–704 fails, the normalized power of the four pumps may be at a ratio of 0.75:0.75:0.75:0.75, and a gain reduction of less than 1.5 dB in the range of approximately 1572 to 1605 nm is experienced relative to the total gain. Thus, as can be seen in the graph of FIG. 7, a pump sharing configuration consistent with the present invention prevents gain reduction to an extent that would ultimately cause loss of the signal.

There is thus provided an optical amplifier configuration including shared pumps, so that at least some power is provided to each of the amplifying fiber segments in the event a pump fails. Consistent with the invention, by coupling the outputs of two or more pumps and then splitting the coupled output and providing the divided output to two or more output fibers, a failsafe for preventing signal loss in the event of pump failure is provided.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. An optical device, comprising:
    a plurality of segments of optical fiber connected along an optical communication path, each of said plurality of segments of optical fiber being doped with a rare earth element and being configured to carry a plurality of optical signals, each of said plurality of optical signals corresponding to a respective one of a plurality of wavelengths;
    a splitter having an input and a plurality of outputs, each of said plurality of outputs being coupled to a respective one of said plurality of segments of optical fiber;
    a coupler having an output and a plurality of inputs, said output being coupled to said input of said splitter; and
    a plurality of pump lasers, each of which being coupled to a respective one of said plurality of inputs of said coupler, wherein a gain associated with each of said plurality of optical signals is reduced by less than 1.5 dB over a range of wavelengths within 1572 nm to 1605 nm upon a decrease in a power level of one said pump lasers, a first selected one of said plurality of outputs of said splitter being configured to supply pump light from said plurality of pump lasers to one of said plurality of segments of optical fiber in a forward direction and a second selected one of said plurality of outputs of said splitter being configured to supply said pump light to said one of said plurality of segments of optical fiber in a reverse direction, said forward and reverse directions being relative to a direction of propagation of said plurality of optical signals carried by said plurality of segments of optical fiber.

2. An optical device in accordance with claim 1, wherein said rare earth element is selected from the group of erbium, neodymium, praseodymium, ytterbium, and mixtures thereof.

* * * * *